Patented Oct. 29, 1935

2,018,694

UNITED STATES PATENT OFFICE 2,018,694

PROCESS OF TREATING ALUMINUM SURFACES

Herbert E. Wetherbee, Cleveland Heights, Ohio, assignor of one-tenth to Benton H. Grant and seven-tenths to Richard F. Grant, both of New York, N. Y.

No Drawing. Application May 14, 1934, Serial No. 725,673

13 Claims. (Cl. 148—6)

The invention particularly relates to the formation upon aluminum surfaces, or the surfaces of aluminum alloys, of hard, crystalline, impervious films or coatings which protect the underlying surfaces from corrosion and which films have high dielectric strength as well as useful optical properties, as will be hereinafter more specifically explained.

For accomplishing the purposes of this invention, I employ a water solution containing both borax and boric acid. Borax is chemically known as sodium tetraborate and its chemical formula is written as follows: $Na_2B_4O_7 10H_2O$. The chemical formula for boric acid is $H_3BO_3$. For simplicity I will refer to these chemical compounds as borax and boric acid. For purposes of illustration, and as a preferred solution combination, I use 200 grams of borax per liter of water and 166 grams of boric acid per liter of water. The solution is preferably used at boiling temperature. This solution is slightly alkaline. When an aluminum article is immersed in the above-mentioned solution there is a very slight etching action upon the aluminum surface which I would explain as taking place during the formation of sodium aluminate which is soluble. Coincident with this etching action is the formation upon said aluminum surface of an oxide film or coating, a portion of which is hard and crystalline in character and a part of which is, I believe, in the soft amorphous form. The reactions involved in forming this film or coating I explain as follows: The soluble sodium aluminate formed in the etching action above-described immediately changes to aluminum borate which is only very slightly soluble. Then immediately follows hydrolysis of the aluminum borate forming hydrous aluminum oxide.

The reactions as above stated represent my belief after careful study of the matter. However, the chemistry involved is somewhat complicated and there might be much disagreement among different chemists in connection therewith. The solutions used and the results obtained, however, are not subject to any question or doubt.

The depth of the film or coating depends upon the time of exposure by immersion in the above-described solution. I have tested this exposure from time intervals of ten minutes to several hours. The same character of film is formed in all cases and the only variable is the thickness of the film or coating depending upon the time exposure. The film or coating I believe is in great part an oxide of the underlying metal but I also believe that it contains other adsorption products in more or less quantity.

While I have hereinabove given my preferred solution combination of water, borax, and boric acid, I desire to disclose that similar results may be obtained when using higher or lower solution concentrations of borax and boric acid and/or by varying the ratios between borax and boric acid. The results are substantially similar in the different solution combinations provided the temperature and time elements are varied. However, my most satisfactory results have been produced on the ratio and concentrations and temperature above-mentioned for my preferred solution combination and with an immersion period of from one to four hours, but for certain purposes other periods of immersion treatment and solution combinations and temperature may be desirable.

After the above-described treatment in a water solution containing both borax and boric acid, the aluminum surface which has been so treated may be allowed to age either in the air or in a solution at normal temperature containing say 20 grams of borax to 16 grams of boric acid per liter of water. This aging action is desirable in order to set and fortify the oxide film and to allow a proper period of crystalline growth. This aging period may vary from twenty-four hours to several days depending upon the character of film desired. After completion of the aging period the aluminum article which has been treated as above-described is then washed in water, either hot or cold, until adhering salts have been removed, thus leaving the oxide film as an extremely hard, thin, adherent coating on the metal. It is my belief that this hard oxide coating is crystalline in nature and that it is in considerable part formed by gradual change from the amorphous form during the process of aging, although there is some of this hard oxide film present immediately after treatment with the borax-boric acid solution.

As an alternative method of setting, fortifying, aging, and improving the crystalline film upon an aluminum article which has been treated in the borax-boric acid solution above-specified, I either immediately treat said article with hot water for such time as may be required to remove the adhering borax and boric acid or I eliminate said hot water treatment depending on the result desired, or I allow the aluminum article to age in the air for a period of from one to several hours, and then, in any of said events, immerse the article in a hot dilute solution of sodium silicate preferably of a composition similar to that used for preserving eggs, viz.:

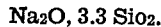
$Na_2O, 3.3\ SiO_2.$

As another alternative method of setting, fortifying, aging, and improving said crystalline film after treatment of the aluminum article in the borax-boric acid solution above mentioned, I either immediately immerse the aluminum article in a solution of normal temperature containing say 20 grams of borax and 16 grams of boric acid per liter of water and leave the article in said solution for a period of from one to several hours or I allow the aluminum article to age in the air for a period of from one to several hours. I then, in either event, remove the article and wash the same in water at normal temperatures and then treat the same by immersion in a hot dilute solution of sodium silicate, preferably of a composition similar to that used for preserving eggs, viz.:

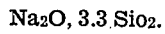
$Na_2O, 3.3\ SiO_2.$

The aging and fortifying treatments in sodium silicate solution above-specified produce satisfactory results after one hour to several hours treatment in a solution containing preferably 50 cc. per liter of 40° Baumé sodium silicate, depending on the film characteristics desired, after which treatments the article is washed free from adhering silicate solution and dried at atmospheric temperature. Obviously the concentration of sodium silicate above-specified may be varied from the preferred concentration mentioned.

The etching of the aluminum surface by the above-described method is very light. The films or coatings formed upon the aluminum base are crystalline and very dense and hard and prevent further corrosion of the underlying aluminum metal and also have high dielectric qualities. Optically, the films or coatings are translucent and when formed on an aluminum base an excellent reflecting medium for light is produced, reflecting in a diffused form the light impinging thereon, the extent and character of the diffusion depending upon the depth of the film or coating and the angles of incidence of the light impinging thereon. It is of course obvious that variations in thickness, density, and other characteristics of said films or coatings will be found desirable depending on the purposes for which said films or coatings are formed. In order to accomplish these purposes I have given the variables in the disclosed treatments.

As another and distinct method of treatment, simple immersion of a polished aluminum article in a solution containing 20 grams of borax and 16 grams of boric acid per liter of water at room temperatures results in the formation of an oxide film which is extremely thin and has good optical characteristics. In this case, time of treatment may require from three or four days to a week's time. This film is soft compared to the films formed by the other methods hereinabove described and is more or less amorphous in character.

What I claim is:

1. A process of treating aluminum surfaces consisting in subjecting such a surface to the action of an alkaline water solution of borax and boric acid.

2. A process of treating aluminum surfaces consisting in subjecting such a surface to the action of an alkaline water solution of borax and boric acid at a boiling temperature.

3. A process of treating aluminum surfaces consisting in subjecting such a surface to the action of a water solution of borax and boric acid, the relative amounts by weight of borax and boric acid used being approximately in the ratio of six to five respectively.

4. A process of treating aluminum surfaces consisting in subjecting such a surface to the action of a water solution of borax and boric acid, the solution consisting of relative proportions of approximately 200 grams borax and 166 grams boric acid per liter of water.

5. A process of treating aluminum surfaces consisting in subjecting such a surface to the action of an alkaline comparatively strong water solution of borax and boric acid, then subjecting the surface to an alkaline comparatively weak water solution of borax and boric acid, and then subjecting the surface to a water solution of sodium silicate.

6. A process of treating aluminum surfaces consisting in subjecting such a surface to the action of an alkaline comparatively strong water solution of borax and boric acid at a boiling temperature, then subjecting the surface to an alkaline comparatively weak water solution of borax and boric acid at a normal temperature, and then subjecting the surface to a water solution of sodium silicate.

7. A process of treating aluminum surfaces consisting in thoroughly cleaning and polishing such a surface, then subjecting the surface to the action of an alkaline water solution of borax and boric acid, then treating the surface with hot water, and then subjecting it to a hot solution of sodium silicate.

8. A process of treating aluminum surfaces consisting in subjecting such a surface to the action of an alkaline water solution of borax and boric acid at a boiling temperature, then subjecting the surface to an alkaline weaker water solution of borax and boric acid at a normal temperature, then washing the surface with water, and then subjecting the surface to a hot dilute water solution of sodium silicate.

9. A process of treating aluminum surfaces consisting in subjecting such a surface to the action of an alkaline water solution of borax and boric acid, permitting the resultant products to age in the air, treating the surface with a solution of sodium silicate, and then washing the surface.

10. A process of treating aluminum surfaces consisting in subjecting such a surface to the action of an alkaline boiling water solution of borax and boric acid for approximately two hours with the formation on the surface of a hard crystalline aluminum oxide film, permitting the resultant products to age in the air for approximately two hours, treating the surface with a hot dilute solution of sodium silicate for approximately two hours thus forming silicic acid gel to fortify the aluminum oxide film, and then removing surplus adhering material.

11. A process of treating aluminum surfaces consisting in subjecting such a surface to the action of an alkaline water solution of borax and boric acid to form an aluminum oxide coating upon the surface, and then fortifying the coating by aging and promoting the crystalline growth thereof.

12. A process of treating aluminum surfaces consisting in subjecting such a surface to the action of an alkaline water solution of borax and boric acid to form an aluminum oxide coating upon the surface, and then aging and fortifying the coating, through crystalline growth, by exposing the surface to air.

13. A process of treating aluminum surfaces consisting in subjecting such a surface to the action of an alkaline comparatively strong water solution of borax and boric acid to form an aluminum oxide coating upon the surface, and then aging and fortifying the coating, through crystalline growth, by treating the surface with an alkaline comparatively weak water solution of borax and boric acid.

HERBERT E. WETHERBEE.